Oct. 2, 1923.
E. C. LEAK
1,469,517
BRUSH GRUBBER AND LEVELER
Filed Jan. 19, 1922
2 Sheets-Sheet 2
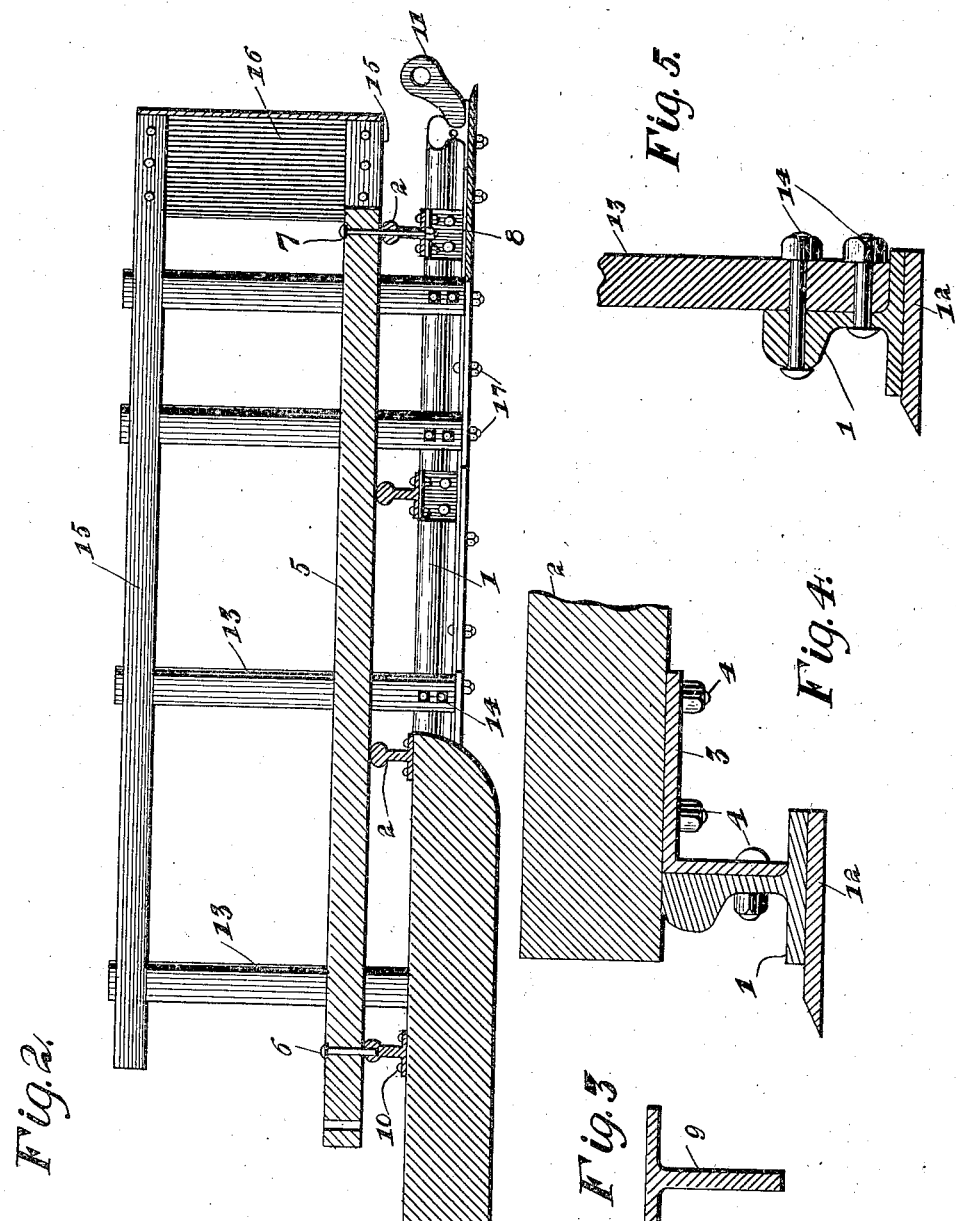
INVENTOR
E. C. Leak Patented Oct. 2, 1923.

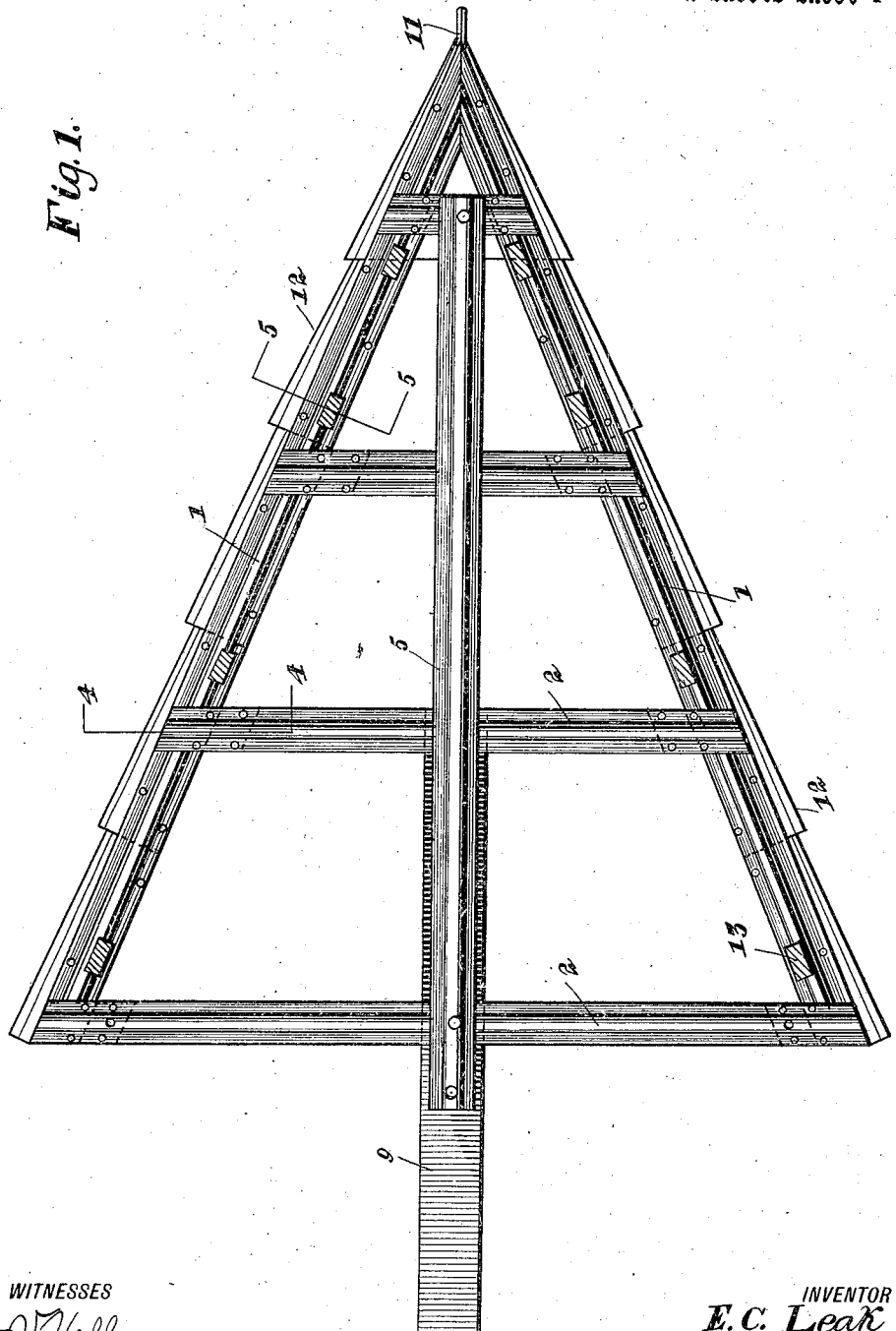

1,469,517

UNITED STATES PATENT OFFICE.

EDWARD COMLY LEAK, OF RENO, NEVADA.

BRUSH GRUBBER AND LEVELER.

Application filed January 19, 1922. Serial No. 530,389.

*To all whom it may concern:*

Be it known that I, EDWARD C. LEAK, a citizen of the United States, and a resident of Reno, in the county of Washoe and State of Nevada, have invented certain new and useful Improvements in Brush Grubbers and Levelers, of which the following is a specification.

My invention is an improvement in sage brush grubbers, and has for its object to provide a simple, easily constructed, economical device of the character specified, wherein an A-frame is provided adapted to be drawn through the sage brush, and provided with cutting blades on its inclined side for cutting or pulling up the brush.

In the drawings:—

Figure 1 is a top plan view of the improved grubber,

Figure 2 is a longitudinal section,

Figure 3 is a transverse section of the runner,

Figures 4 and 5 are sections on the lines 4—4 and 5—5 of Figure 1.

In the present embodiment of the invention, an A-frame is provided, which in the present instance, is formed from T-rails. The frame is substantially V-shaped in outline and consists of converging side members 1 and connecting cross members 2. The side members 1 are secured together at their front ends, and the cross bars 2 rest upon the side members at their ends, and are secured thereto by angle brackets 3, the said brackets being bolted to the base flanges of the cross members, and to the webs of the side members by bolts and nuts 4.

A central longitudinally extending member 5 is seated on the cross members, and is secured to the end cross members by bolts 6 and 7, the bolts 7 extending downwardly through the forward cross member 2 and being engaged by a nut 8 below the same.

A guide and runner 9 is secured to the two rear cross bars 2 below the same and at the longitudinal center of the frame, by means of bolts 10 as shown, the said runner being made from an I-beam having its lower flanges cut away as clearly shown in Figure 3. The free edge of this guide and runner extends well below the underface of the side members 1 of the frame, and it will be evident that when the frame is drawn along the ground in a manner to be presently described, the guide and runner will by its engagement in the ground hold the frame from being deflected laterally by stiff brush.

Draft connecting apparatus indicated at 11 is secured to the side members at their connected ends, and any suitable draft mechanism may be connected with this connection, as for instance, double-trees when a team is used, or a suitable hitch when a tractor is used.

A series of blades 12 is secured to the underface of each of the side members 1, each of the said blades being of greater width at one end than at the other, and the blades of each series are as arranged in Figure 1, that is, with the side end rearmost. Thus the rear end of each blade extends slightly beyond the front end of the succeeding blade, the distance being in accordance with conditions, preferably 1¾ to 2 inches.

Uprights 13 are secured to the inner faces of the treads and webs of the side members 1. The ball of the tread is cut away to receive the uprights, the arrangement being such that the uprights fit closely against the web of the rail in the notched or cutaway portions of the tread.

The standards are bolted to the side members as indicated at 14, and they are connected at their tops and near their bottoms by metallic plates 15. The forward standard at each side is just behind the forward cross bar 2, and an angle plate 16 is secured to the forwardly extending ends of the plates 15. This plate 16 acts as a fender for the brush, and prevents it from becoming caught at the front of the frame.

In operation, the frame is drawn through the brush in any suitable or desired manner, with the guide and runner 9 engaging in the ground. The blades strike the brush and shear the same close to the surface of the ground. The runner 9 prevents the frame being shoved aside, by heavy brush and causes it to be moved straight ahead so that the brush may be cut in swaths. The blades are secured to the flanges of the side members by bolts and nuts 17.

In operation the cutting blades may not always shear the brush off entirely, but may cut into body of the brush and hold it, and the wedge shape of the machine moving along pulls said unsheared brush out by the roots and leaves it in windrows at either side of the machine. A great quantity of the brush is cut off but there is also a large portion which is pulled out by the roots.

I claim:—

1. A device of the character specified, comprising an A-frame having series of blades at the under surface thereof and extending beyond the sides of the frame, each blade having its cutting edge lying in a plane extending obliquely to the plane of the proximate side of the frame and being spaced from the latter and a guide and runner at the rear and center of the frame, and extending below the frame to form a fin or vane for engaging within the ground when the frame is drawn over the ground, said frame having a super-structure provided with a vertically disposed angular deflecting plate arranged at the front of the frame with the apex of the deflecting plate foremost.

2. A device of the character specified, comprising an A-frame having series of blades at the under surface thereof extending beyond the sides of the frame, each blade having its cutting edge lying in a plane extending obliquely to the plane of the proximate side of the frame and being spaced from the latter and a guide and runner at the rear and center of the frame, and extending below the frame to form a fin or vane for engaging within the ground when the frame is drawn over the ground, and a vertically disposed angular deflecting plate supported at the front of the frame with the apex of said deflecting plate foremost and substantially in the plane of said guide and runner.

3. A device of the character described comprising a substantially V-shaped frame including side members converging together at their forward ends, a series of cutting blades carried by each side member with the cutting edge of each blade located laterally of the side member and in a plane rearwardly divergent in respect to the plane of the side member, and an angular deflecting plate supported on the frame at the forward end of the latter, said angular deflecting plate having the respective arm portions thereof disposed substantially in vertical alignment wth the corresponding sides of the frame.

4. A device of the character described comprising a substantially V-shaped frame including side members converging together at their forward ends, a series of cutting blades carried by each side member with the cutting edge of each blade located laterally of the side member and in a plane rearwardly divergent in respect to the plane of the side member, means at the forward end of the frame and in the longitudinal median line thereof for establishing connection with a draft mechanism, and an angular deflecting plate supported on the frame at the forward end of the latter, said angular deflecting plate having the respective arm portions thereof disposed substantially in vertical alignment wth the corresponding sides of the frame.

5. A device of the character described comprising a substantially V-shaped frame including side members converging together at their forward ends, a series of cutting blades carried by each side member with the cutting edge of each blade located laterally of the side member and in a plane rearwardly divergent in respect to the plane of the side member, means at the forward end of the frame and in the longitudinal median line thereof for establishing connection with a draft mechanism, a depending guide at the rearward end of the frame and and in the longitudinal median line thereof for engaging a surface traversed by the frame to hold the latter against lateral movement when being drawn in a forward direction, and an angular deflecting plate supported on the frame at the forward end of the latter, said angular deflecting plate having the respective arm portions thereof disposed substantially in vertical alignment with the corresponding sides of the frame.

EDWARD COMLY LEAK.